United States Patent [19]

Lehmann

[11] 4,321,350

[45] Mar. 23, 1982

[54] PROCESS FOR THE CATALYTIC SETTING OF POLYURETHANE MOLDING COMPOSITIONS

[75] Inventor: Hans-Dieter Lehmann, Waltenhofen, Fed. Rep. of Germany

[73] Assignee: Gambro Dialysatoren KG, Fed. Rep. of Germany

[21] Appl. No.: 198,110

[22] PCT Filed: Aug. 7, 1978

[86] PCT No.: PCT/EP78/00006

§ 371 Date: May 20, 1979

§ 102(e) Date: Apr. 30, 1979

[87] PCT Pub. No.: WO79/00154

PCT Pub. Date: Apr. 5, 1979

[30] Foreign Application Priority Data

Apr. 30, 1979 [SE] Sweden .............................. 7710502

[51] Int. Cl.³ .................. C08G 18/22; C08G 18/16
[52] U.S. Cl. ........................................... 528/48; 528/84
[58] Field of Search .................. 521/124, 130; 528/48, 528/84

[56] References Cited

U.S. PATENT DOCUMENTS

| | | | |
|---|---|---|---|
| 2,461,761 | 2/1949 | Nye | 521/124 |
| 3,087,900 | 4/1963 | Brown | 260/2.5 |
| 3,087,901 | 4/1963 | Brown | 260/2.5 |
| 3,179,625 | 4/1965 | Emhart | 260/75 |
| 3,385,806 | 5/1968 | Critchfield | 521/130 |
| 3,415,891 | 12/1968 | Turumaru et al. | 260/611.5 |
| 3,567,663 | 3/1971 | Triols et al. | 521/130 |
| 4,066,580 | 1/1978 | Falkenstein et al. | 521/130 |
| 4,220,727 | 9/1980 | Godlewski | 521/124 |

FOREIGN PATENT DOCUMENTS 2202118 5/1974 France .

Primary Examiner—H. S. Cockeram
Attorney, Agent, or Firm—Lerner, David, Littenberg & Samuel

[57] ABSTRACT

Polyurethane molding compositions are disclosed which contain diisocyanates and polyols and/or polyurethane prepolymers and sorbic acid or cinnamic as a setting catalyst. A process for preparing such compositions is also disclosed. These compositions give a rapid initial hardening and therefore mold release properties, which contribute to increased production speeds. Moreover, the acids used are physiologically safe, so that the process may be used for the production of objects used in medical science. The acids may also be used in a physiologically safe mixture with a heavy-metal containing catalyst.

13 Claims, No Drawings

PROCESS FOR THE CATALYTIC SETTING OF POLYURETHANE MOLDING COMPOSITIONS

BACKGROUND OF THE INVENTION

The invention relates to polyurethane molding compositions, such as polyurethane casting compositions, which are prepared by the polyaddition of diisocyanates to polyols or from prepolymers with appropriate end groups. More specifically, the invention relates to polyurethane molding compositions containing catalysts which aid such compositions in passing from the liquid to the solid state and in setting in economically justifiable times.

Polyurethane molding compositions, such as casting compositions, are utilized in medical technology, for example, in dialysis and diafiltration equipment for the treatment of blood and blood fluids. Since these blood and blood fluids are returned to the blood flow after dialysis or diafiltration, it is necessary that all components of casting compositions, which come into contact with the blood or blood fluids, are absolutely safe physiologically and completely nonpoisonous.

For this reason, polyurethane molding compositions, when used in medical applications, cannot be hardened with many well-known catalysts, since these catalysts either must be avoided for toxicological reasons and/or have other disadvantages. Accordingly, organic tin compounds and tertiary amines are not absolutely safe for toxicological reasons. Moreover, the tertiary amines also have the disadvantage that they lead to the formation of bubbles in many systems, especially if the work is not conducted with the complete exclusion of moisture.

Other well-known, especially salt-like catalysts, have only limited solubility in the polyol component and, being a solid substance, are not readily measured out. When dissolved in the diiscyonate component, they lead to undesirable side effects, and decomposition and resinification are observed on storage.

For toxicological reasons, acids, such as hydrochloric acid, acetic acid and trichloroacetic acid, also may not be used in medical technology, for example, when casting hollow-fiber or flat-film dialyzers.

For this reason, a catalyst-free polyurethane molding composition is suggested by German Offenlegungsschrift No. 2,340,661, so that this molding composition contains no toxicologically doubtful components. However, such casting compositions have a disadvantage in that they require a relatively long period of setting, that the setting must be carried out at comparatively high temperatures and that the catalyst-free setting can only be carried out with specific compositions of the molding material.

It is well known that certain physiologically absolutely safe carboxylic acids may be used as catalysts for polyurethane molding compositions. According to the U.S. Patent, oleic acid is used for this purpose, according to Chemical Abstracts, vol. 84, 1976, reference 61474p, octanoic acid is used, and according to the British Pat. No. 1,453,152, an alkyl or alkoxy-substituted benzoic acid is used. Such catalysts, however, give relatively long mold-release times, which lead to a decreased output per day.

Thus, polyurethane molding compositions and processes for making molding compositions which are not poisonous, which are physiologically absolutely safe, which do not give off any physiologically doubtful material on contact with blood or other body fluids, and which provide an accelerated mold-release time, i.e., to reach as quickly as possible a degree of hardness which will permit the molding to be taken from the mold without danger of deformation, are highly desirable.

SUMMARY OF THE INVENTION

It has now been found that these advantages can be provided by catalytically set polyurethane molding compositions containing as a catalyst setting agent a member from the group consisting of sorbic acid, parasorbic acid, cinnamic acid and mixtures thereof. These compositions can be prepared by the catalytic setting of polyurethane molding compositions, which contain diisocyanates and polyols and/or polyurethane prepolymers with isocyanate or hydroxyl groups, with at least one physiologically safe carboxylic acid selected from the group consisting of sorbic acid, parasorbic acid, and cinnamic acid.

In a preferred embodiment the catalytically set polyurethane molding compositions are prepared by reacting polyisocyanate with polyol in the presence of a setting agent selected from the group consisting of sorbic acid, parasorbic acid, cinnamic acid and mixtures thereof at a temperature and for a time sufficient to achieve a Shore A hardness of at least about 25.

In another preferred embodiment of the present invention, the carboxylic acid setting agent is used in mixture with a physiologically safe heavy metal containing catalyst.

The setting agent in the catalytically set polyurethane molding compositions of the present invention can comprise from about 0.1 to about 3.0 weight percent of said composition. Preferably, the setting agent comprises from about 0.4 to about 1.0 weight percent of the composition.

DETAILED DESCRIPTION OF THE INVENTION

The setting agents for the polyurethane molding compositions of the present invention include sorbic acid, i.e., 2,4-hexadienoic acid, parasorbic acid, cinnamic acid and mixtures thereof. These carboxylic acids are not poisonous, are odorless and do not form foam. By way of example, sorbic acid is used as a food additive. These carboxylic acids are also soluble in the polyol component, which simplifies their processing.

Setting with the help of sorbic acid or cinnamic acid can be carried out at room temperature, for example, at from about 18° to about 24° C., or at elevated temperatures, for example, between room temperature and 70° C.

The sorbic acid, parasorbic acid or cinnamic acid may either be used alone or together with heavy metal containing catalysts, provided that the mixtures of carboxylic acids with these heavy metal containing catalysts are physiologically safe. Suitable heavy metal containing catalyst include, for example, iron acetyl acetonate or di-N-octyl-di-(thioglycollic acid octyl ester). Surprisingly, there is a synergistic effect between the carboxylic acids and such heavy metal containing catalysts, in that the setting proceeds more rapidly than would have been expected by the additive effect of both components individually.

The term polyurethane prepolymer is used herein in the conventional sense. Such polyurethane prepolymers are usually prepared by the reaction of an excess of an organic diisocyanate of the general formula

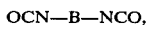

OCN—B—NCO, in which B is a divalent organic residue, with a polyether or polyester polyol with a molecular weight of 400 to 10,000, usually of 600 to 7,000 and preferably of 1,000 to 6,000, a prepolymer with —NCO end groups being obtained. The equivalent ratio of diisocyanate to polyol should be greater than 1 and, preferably, is large enough so that the polyurethane prepolymer melts below 80° C., and most preferably, so that the prepolymer is liquid at room temperature.

Suitable polyfunctional polyols for use in the preparation of the polyurethane prepolymers by reactions with a suitable isocyanate compound include polyalkylene ether glycols of the general formula

HO—(RX)$_n$—H in which R represents the same or different alkylene residues with up to about 10 carbon atoms, X represents oxygen or sulfur and n is an integer such that the molecular weight of the polyakylene ether glycol is at least about 400 and, by way of example, lies somewhere in the range of 400 to about 10,000. Preferred polyalkylene ether glycols of this general formula include polyethylene glycols, polypropylene glycols, polybutylene glycols, polytetramethylene glycols, polyhexamethylene glycols and the like. These glycols can be obtained, for example, by the acid catalyzed condensation of the corresponding monomeric glycols or by the condensation of low molecular weight alkylene oxides, such as ethylene oxide, propylene oxide and the like, either with themselves or with glycols such as ethylene glycol, propylene glycol or the like.

Other suitable polyol reactants comprise polyalkylenearylene ether glycols, which also have high molecular weights in the range of about 400 to about 10,000. The polyalkylenearylene ether glycols differ from the above-described polyalkylene glycols in that they have arylene residues, such as phenyl residues or naphthyl residues, or optionally, substituted arylene residues such as, for example, arylene residues substituted by alkyl groups or aryl groups or the like, instead of some of the alkylene residues in the polyalkylene glycols. Polyalkylenearylene glycols of the type conventionally used for this purpose usually contain at least one alkylene ether residue with a molecular weight of about 500 for every aryl residue present.

Essentially linear polyesters, which contain several isocyanate reactive hydroxyl groups, represent another class of reactive, organic, polyfunctional polyols which may be employed in the preparation of the polyurethanes useful in the present invention. Although the state of the art of the preparation of polyesters suitable for this purpose has already been described in great detail and actually is not a part of the present invention, it is nevertheless mentioned here for the purpose of explanation that polyesters of this type can be produced by the combination of multivalent alcohols, generally a saturated aliphatic diol, with a polycarboxylic acid or anhydride thereof. Suitable multivalent alcohols comprise ethylene glycol, 1,2-propanediol, 1,3-propanediol, 1,3-butanediol, 1,4-butanediol, 1,2-pentanediol, 1,5-pentanediol, 1,3-hexanediol, 1,6-hexanediol, diethylene glycol, dipropylene glycol, triethylene glycol, tetraethylene glycol and the like. Mixtures of such diols can also be used with one another or with smaller amounts of polyols having more than two hydroxyl groups, preferably saturated aliphatic polyols, such as glycerol, trimethylol methane, trimethylol propane, pentaerithritol, sorbitol and the like. The polycarboxylic acids or anydrides thereof are generally dicarboxylic acids or their anhydrides. Preferably, the polycarboxylic acid or anhydride is either a saturated one or one which contains only benzenoid unsaturation, such as oxalic acid, malonic acid, succinic acid, glutaric acid, adipic acid, pimelic acid, suberic acid, malic acid, azelaic acid, sebacic acid, phthalic acid, cyclohexane dicarboxylic acid and endomethylenetetrahydrophthalic acids and the like, as well as their isomers, homologs and other substituted derivatives, such as the chloro derivatives. Mixtures of such acids can also be either with themselves or with unsaturated carboxylic acids or anhydrides of the same, such as maleic acid, fumaric acid, citraconic acid, and itaconic acid or the like, as well as with the polycarboxylic acids with 3 or more carboxyl groups, such as aconitic acid and the like.

The essentially linear or branched polyesters, which are usually employed in the preparation of polyurethane resins, preferably have molecular weights in the range of about 750 to 3000. In addition, they generally have relatively low acid numbers, preferably below about 60 and most preferably, as low as can be obtained under practical conditions, for example, 2 or less. Correspondingly, they generally have relatively high hydroxyl numbers, preferably, from about 30 to about 700. In the preparation of these polyesters, an excess of polyol over polycarboxylic acid is generally used in order to ensure that the resultant, essentially linear polyester chains contain a sufficient number of reactive hydroxyl groups.

Still another class of suitable organic, polyfunctional polyol reactants includes polyalkylene ether polyols with more than two reactive hydroxyl groups, such as polyalkylene ether triols, tetrols and the like. Such polyfunctional polyols are prepared, for example, by the reaction of polyols, such as glycerol, trimethylol ethane, trimethylol propane, pentaerithritol, dipentaerithritol, sorbitol and the like with low molecular alkylene oxides, such as ethylene oxide, propylene oxide and the like.

Castor oils and polyols based on castor oils, obtained from castor oil by, for example, chemical modification (see Patton et al., Gummi, Asbest, Kunststoffe, 14 (1961), pages 918 ff.), also can be used as the polyol component in the present invention.

As can be seen from the above description, mixtures of the various reactive, polyfunctional polyols can also be employed in the preparation of polyurethane prepolymers useful in the present invention.

The polyester polyols or polyether polyols, which were described above, can be combined with a slight excess of anyone of a large number of polyisocyanates in order to form a polyurethane prepolymer. As stated above, the polyisocyanate can conveniently be expressed by the formula

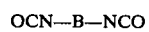

OCN—B—NCO in which B represents a divalent organic residue and may be aliphatic, aromatic or aliphatic-aromatic in nature. Accordingly, the divalent or double-bonding residue B may be a phenyl residue, which is unsubstituted or substituted by chlorine atoms, nitro groups, low molecular alkoxy groups, low molecular alkyl groups, phenoxy groups or phenyl residues; a diphenylene residue which can be unsubstituted or substituted by low molecular weight alkyl groups or low molecular weight alkoxy groups; a bisphenylene lower alkylene residue, which may be unsubstituted or substituted by low molecular weight alkoxy groups; a halogenated alkyl residue with 2 to 8 carbon atoms, which may be unsubstituted or substituted by low molecular weight alkoxy groups; a cycloalkylene residue with 4 to 8 carbon atoms, which may be unsubstituted or substituted by low molecular weight alkyl groups; or a bis-cyclohexylene lower alkyl residue.

Divalent organic residues B may be substituted by various substituents, such as, for example, by low molecular weight alkoxy groups, by low molecular weight alkyl groups, phenyl residues or phenoxy residues. Representative polyisocyanates are, for example: 1-methoxyphenyl-2,4-diisocyanate, 1-methyl-4-methoxyphenyl-2,5-diisocyanate, 1-ethoxyphenyl-2,4-diisocyanate, 1,3-dimethoxyphenyl-4,6-diisocyanate, 1,4-dimethylphenyl-2,5-diisocyanate, 1-propoxyphenyl-2,4-diisocyanate, 1-isobutoxyphenyl-2,4-diisocyanate, 1,4-diethoxyphenyl-2,5-diisocyanate, toluene-2,4-diisocyanate, toluene-2,6-diisocyanate, diphenylether-2,4-diisocyanate, naphthalene-1,4-diisocyanate, 1,1'-dinaphthalene-2,2-diisocyanate, biphenyl-2,4-diisocyanate, 3,3'-dimethylbiphenyl-4,4'-diisocyanate, 3,3'-dimethoxybiphenyl-4,4'-diisocyanate, diphenylmethane-4,4'-diisocyanate, diphenylmethane-2,4'-diisocyanate, diphenyl-methane-2,2'-diisocyanate, 3,3'-dimethoxydiphenylmethane-4,4'-diisocyanate, benzophenone-3,3'-diisocyanate, ethylene diisocyanate, propylene diisocyanate, butylene diisocyanate, pentylene diisocyanate, methylbutylene diisocyanate, tetramethylene diisocyanate, pentamethylene diisocyanate, hexamethylene diisocyanate, dipropyl diisocyanate ether, heptamethylene diisocyanate, 2,2-dimethylpentylene diisocyanate, 3-methoxy-hexamethylene-diisocyanate, octamethylene diisocyanate, 2,2,4-trimethylpentylene diisocyanate, 3-butoxyhexamethylene diisocyanate, 1,3-dimethylbenzene diisocyanate, 1,4-dimethylbenzene diisocyanate, 1,2-dimethyl cyclohexane diisocyanate, 1,4-dimethylcyclohexane diisocyanate, 1,4-diethylbenzene diisocyanate, 1,4-dimethylnaphthalene diisocyanate, 1,5-dimethylnaphthalene diisocyanate, cyclohexane-1,3-diisocyanate, cyclohexane-1,4-diisocyanate, 1-methylcyclohexane-2,4-diisocyanate, 1-methylcyclohexane-2,5-diisocyanate, 1-ethylcyclohexane-2,4-diisocyanate, dicyclohexylmethane-4,4'-diisocyanate, dicyclohexylmethylmethane-4,4'-diisocyanate, dicyclohexyldimethylmethane-4,4'-diisocyanate, 2,2-dimethyldicyclohexylmethane-4,4'-diisocyanate, 3,3', 5,5'-tetramethyldicyclohexylmethane-4,4'-diisocyanate, 4,4'-methylene-bis-cyclohexyl isocyanate, ethylidine diisocyanate, 1,2-propylene diisocyanate, 4,4'-diphenyl diisocyanate, dianisidine diisocyanate, 1,5-naphthalene diisocyanate, 4,4'-diphenyl ether diisocyanate, m- and p-phenylene diisocyanate, 4,4'-toluidine diisocyanate, isopropylene-bis-(phenyl or cyclohexyl isocyanate), 1,3-cyclopentylene diisocyanate, 1,3-cyclohexylene diisocyanate, 1,4-cyclohexylene diisocyanate, chlorodiphenyl diisocyanate, 4,4',4"-triphenylmethane triisocyanate, 1,3,5-benzene triisocyanate or phenylethylene diisocyanate.

The amounts of setting catalysts used in the present invention can vary from about 0.1 to about 3.0 percent by weight, and preferably from about 0.4 to about 1.0 percent by weight of the molding composition. The time needed to obtain a hardened mixture having a "Shore A hardness" of between 20 to 30, which can be removed from the mold, varies depending upon the temperature of setting, the catalyst concentration, and the amount and type of the polyurethane system. The temperature for setting the composition can vary from ambient temperatures to elevated temperatures of about 40° C. or up to 70° C. For small amounts between 10 and 50 g., the setting time lies between a few minutes and 2 hours, for example, between 15 and 30 minutes. At room temperature, the final hardness of these castings is reached at times between several hours and several days.

The composition and process of the present invention can be used for the production of objects usable in medical science, for example, for casing and connecting the various parts of dialysis and diafiltration equipment. Since the hardness required for mold release is reached relatively rapidly, a high production output can be achieved with the present composition and process.

The following examples are presented for the purposes of illustrating, but not limiting, the process of the present invention.

EXAMPLE

A catalyst-containing polyol component (64 parts), consisting of 90 percent castor oil, 10 percent polyether (molecular weight 2600) and 0.5 percent of the acid to be tested, were mixed with 36 parts of diphenylmethane-4,4'-diisocyanate polyether prepolymer. The mixture was degassed under vacuum. Samples of this mixture (40 g) were poured into paper cups and hardened at 40° C. At this temperature, the Shore A hardness was measured after 30 minutes. A Shore A hardness was regarded as critical for the mold release. This procedure was carried out with sorbic acid, cinnamic acid, oleic acid, octanoic acid, 2-methoxy benzoic acid, o-tolyl acid, m-tolyl acid and p-tolyl acid, respectively. The results are set forth below in the Table.

TABLE

| Catalyst | Shore A. Hardness after 30 minutes |
| --- | --- |
| sorbic acid | 27 |
| cinnamic acid | 25 |
| oleic acid | not measurable |
| octanoic acid | 15 |
| 2-methoxybenzoic acid | not measurable |
| o-tolyl acid | 22 |
| m-tolyl acid | 20 |
| p-tolyl acid | 15 |

The values in the Table show that only sorbic acid and cinnamic acid have reached the value of 25 after 30 minutes, which is critical for mold release.

Heavy foam formation was observed in the case of octanoic acid and oleic acid. This also explains the low final hardness. There was hardly any bubble formation with sorbic acid or o-tolyl acid.

It will be understood that the embodiments described above are merely exemplary and that persons skilled in the art may make many variations and modifications without department from the spirit and scope of the invention. All such modifications and variations are intended to be included within the scope of the invention as defined by the appended claims.

What is claimed is:

1. A catalytically-set polyurethane molding composition substantially free from foam and containing as a catalyst setting agent a physiologically acceptable carboxylic acid selected from the group consisting of sorbic acid, parasorbic acid, cinnamic acid and mixtures thereof.

2. A composition according to claim 1, wherein said setting agent comprises from about 0.1 to about 3.0 weight percent of the molding composition.

3. A composition according to claim 1, wherein said setting agent comprises from about 0.4 to about 1.0 weight percent of the molding composition.

4. A composition according to claim 1, in which said carboxylic acid is used in mixture with a heavy metal catalyst.

5. A catalytically-set polyurethane molding composition prepared by reacting polyisocyanate with polyol or polyurethane prepolymers having isocyanate or hydroxyl groups at temperatures of from ambient temperature to about 70° C. in the presence of a catalytically effective amount of at least one physiologically acceptable carboxylic acid capable of achieving a substantially foam free composition with a Shore A hardness of 25 in about 30 minutes.

6. A process comprising reacting polyisocyanate with polyol or polyurethane prepolymers having isocyanate or hydroxyl groups in the presence of a catalytically effective amount of at least one physiologically safe carboxylic acid selected from the group consisting of sorbic acid, parasorbic acid and cinnamic acid.

7. A process according to claim 6, comprising reacting a polyisocyanate with a polyol in the presence of a setting agent selected from the group consisting of sorbic acid, parasorbic acid, cinnamic acid and mixtures thereof, at a temperature and for a time sufficient to achieve a Shore A hardness of at least about 25 in about 30 minutes.

8. A process according to claim 6, wherein said setting agent comprises from about 0.1 to about 3.0 weight percent of the molding composition.

9. A process according to claim 6, wherein said setting agent comprises from about 0.4 to about 1.0 weight percent of the molding composition.

10. A process according to claim 6, wherein the process is carried out at a temperature in the range of from ambient temperature to about 70° C.

11. A process according to claim 6, in which said carboxylic acid is used in mixture with a heavy metal catalyst.

12. A process according to claim 6, wherein said polyol is selected from the group consisting of polyalkylene ether glycols, polyalkylene ether polyols, polyalkylenearylene ether glycols and polyesters containing isocyanate-reactive hydroxyl groups.

13. A process according to claim 6, wherein polyisocyanate is selected from the group consisting of 1-methoxyphenyl-2,4-diisocyanate, 1-methyl-4-methoxyphenyl-2,5-diisocyanate, 1-ethoxyphenyl-2,4-diisocyanate, 1,3-dimethoxyphenyl-4,6-diisocyanate, 1,4-dimethylphenyl-2,5-diisocyanate, 1-propoxyphenyl-2,4-diisocyanate, 1-isobutoxyphenyl-2,4-diisocyanate, 1,4-diethoxyphenyl-2,5-diisocyanate, toluene-2,4-diisocyanate, toluene-2,6-diisocyanate, diphenylether-2,4-diisocyanate, naphthalene-1,4-diisocyanate, 1,1'-dinaphthalene-2,2-diisocyanate, biphenyl-2,4-diisocyanate, 3,3'-dimethylbiphenyl-4,4'-diisocyanate, 3,3'-dimethoxybiphenyl-4,4'-diisocyanate, diphenylmethane-4,4'-diisocyanate, diphenylmethane-2,4'-diisocyanate, diphenylmethane-2,2'-diisocyanate, 3,3'-dimethoxydiphenylmethane-4,4'-diisocyanate, benzophenone-3,3'-diisocyanate, ethylene diisocyanate, propylene diisocyanate, butylene diisocyanate, pentylene diisocyanate, methylbutylene diisocyanate, tetramethylene diisocyanate, pentamethylene diisocyanate, hexamethylene diisocyanate, dipropyl diisocyanate ether, heptamethylene diisocyanate, 2,2-dimethylpentylene diisocyanate, 3-methoxy-hexamethylene-diisocyanate, octamethylene diisocyanate, 2,2,4-trimethylpentylene diisocyanate, 3-butoxyhexamethylene diisocyanate, 1,3-dimethylbenzene diisocyanate, 1,4-dimethylbenzene diisocyanate, 1,2-dimethyl cyclohexane diisocyanate, 1,4-dimethylcyclohexane diisocyanate, 1,4-diethylbenzene diisocyanate, 1,4-dimethylnaphthalene diisocyanate, 1,5-dimethylnaphthalene diisocyanate, cyclohexane-1,3-diisocyanate, cyclohexane-1,4-diisocyanate, 1-methylcyclohexane-2,4-diisocyanate, 1-methylcyclohexane-2,5-diisocyanate, 1-ethylcyclohexane-2,4-diisocyanate, dicyclohexylmethane-4,4'-diisocyanate, dicyclohexylmethylmethane-4,4'-diisocyanate, dicyclohexyldimethylmethane-4,4'-diisocyanate, 2,2-dimethyldicyclohexylmethane-4,4'-diisocyanate, 3,3', 5,5'-tetramethyldicyclohexylmethane-4,4'-diisocyanate, 4,4'-methylene-bis-cyclohexyl isocyanate, ethylidine diisocyanate, 1,2-propylene diisocyanate, 4,4'-diphenyl diisocyanate, dianisidine diisocyanate, 1,5-naphthalene diisocyanate, 4,4'-diphenyl ether diisocyanate, m- and p-phenylene diisocyanate, 4,4'-toluidine diisocyanate, isopropylidene-bis-(phenyl or cyclohexyl isocyanate), 1,3-cyclopentylene diisocyanate, 1,3-cyclohexylene diisocyanate, 1,4-cyclohexylene diisocyanate, chlorodiphenyl diisocyanate, 4,4',4"-triphenylmethane triisocyanate, 1,3,5-benzene triisocyanate or phenylethylene diisocyanate.

* * * * *